United States Patent
Madsen

[15] 3,662,201
[45] May 9, 1972

[54] COMMUTATION SYSTEM FOR DYNAMOELECTRIC MACHINES

[72] Inventor: John E. Madsen, Lemont, Ill.

[73] Assignee: General Motors Corporation, Detroit, Mich.

[22] Filed: Dec. 14, 1970

[21] Appl. No.: 97,614

[52] U.S. Cl.............................................310/220, 310/225
[51] Int. Cl..........................................................H01r 39/46
[58] Field of Search.........................................310/219–225

[56] References Cited

UNITED STATES PATENTS

| | | | |
|---|---|---|---|
| 811,304 | 1/1906 | Latour | 310/225 |
| 1,352,920 | 9/1920 | Scherbius | 310/220 |
| 1,635,002 | 7/1927 | Lennox | 310/220 X |
| 3,453,513 | 7/1969 | Bates et al. | 310/220 X |

Primary Examiner—William M. Shoop, Jr.
Assistant Examiner—Mark O. Budd
Attorney—E. W. Christen, C. R. Meland and Richard G. Stahr

[57] ABSTRACT

In a preferred form, a commutation system for dynamoelectric machines includes a pair of commutator rings connected to an armature winding and carrying two sets of brushes. A plurality of working circuits are formed between pairs of brushes in the two brush sets so that work current in each working circuit flows through one pair of brush contacts. However, coils undergoing commutation in the armature winding are short-circuited by two pairs of brush contacts. This increases the brush contact resistances through which local current must flow when it is developed in the coils undergoing commutation. The increased brush contact resistances develop higher brush voltage drops to reduce the undesirable effects of the local currents without increasing losses in the work currents.

4 Claims, 4 Drawing Figures

INVENTOR
John E. Madsen
BY Robert W. Smith
ATTORNEY

INVENTOR.
John E. Madsen
BY Robert W. Smith
ATTORNEY 3,662,201

COMMUTATION SYSTEM FOR DYNAMOELECTRIC MACHINES

BACKGROUND OF THE INVENTION

This invention relates to commutation systems for dynamoelectric machines and more particularly to a commutation system for improving commutation and reducing brush arcing by increasing the effective resistance in the short circuit paths of coils undergoing commutation without increasing the effective resistance in the armature working circuits.

In commutation systems for dynamoelectric machines of the commutator type, one of the chief concerns is reduction of the arcing which occurs at the brush contacts formed between the brushes and the commutator segments. Brush arcing caused by uneven current distribution along the brush face results from current which is developed during the commutation process and deviates from the so-called ideal or perfect commutation current characteristics.

In general, the ideal commutation of an armature coil undergoing commutation is provided when the coil current decreases at a linear rate from a working level in one direction to zero and then increases at the same linear rate to the working level in the opposite direction. In the general case, this occurs when the coil ends are connected to commutator segments passing under a brush during a brief interval when the direction of current in the coil is reversed. The current reversal is performed in a commutation zone as the coils move between oppositely directed magnetic fields produced at the main field poles of the machine stator.

During commutation, the coil is short-circuited through the brush as it bridges the commutator segments connected to the coil ends. The coil is then connected in a short circuit path having a substantially low resistance. This short circuit path circulates local currents through the coil in addition to the work current which reverses direction in the coil as the coil is transferred from one working circuit to another. These local currents cause undesired effects in the commutation current characteristics to produce current hot-spots and arcing at the brush contacts. These local currents are developed by self-induced or reactance voltages generated in the short circuited coils.

In the initial design of a commutator system for a dynamoelectric machine, the brushes are oriented relative to the commutator so that the coils being commutated are in a neutral zone where the main magnetic fields between adjacent main field poles are minimum. Armature magnetic fields developed by current in the armature winding combine with the main magnetic fields to produce resultant magnetic fields having neutral zones which are shifted. In the case of a machine which is rotated in one direction only, the orientation of the brushes is relocated so as to compensate for the average effects of the armature reaction. Where the machine is bidirectional or to provide additional compensation, compensating windings are used to produce magnetic fields tending to further neutralize the effects of the armature reaction.

It is known, however, that even with effective compensation for armature reaction, there remains the self-induced reactance voltages in the short circuited coils as they are being commutated. These reactance voltages are developed by the coils cutting the magnetic fields developed in the armature end windings and existing in the armature slots. Also, reactance voltages result from the coil inductance and the rapid current changes of the reversing coil current during commutation. It is, therefore, known to design dynamoelectric machines so as to produce counteracting voltages in the coils undergoing commutation intended to oppose and, as nearly as possible, neutralize the reactance voltages. To accomplish this, the brushes may be further oriented, in the case of a machine operated in one direction, so as to compensate or neutralize the effects of the coil reactance voltages. Also, it is known to utilize auxiliary or commutating field poles also referred to as interpoles which develop opposing magnetic fields to generate counteracting voltages to neutralize both the effects of armature reaction and of the coil reactance voltages. This minimizes some of the effects that cause changes in the ideal commutation current characteristics.

While the aforementioned techniques for minimizing the reactance voltages to reduce arcing at the brush contacts are used, total compensation which will substantially eliminate the local currents in the coils being commutated is difficult to attain in most practical applications. Aside from the complications involved in compensation of armature reaction at varying speed and load conditions, the coil reactance voltages are known to vary with time so as to be pulsating and to also vary with various load and speed conditions. Accordingly, in many instances the compensating fields fail to generate completely effective neutralizing voltages under all conditions.

It has been suggested in prior commutation systems to reduce arcing by providing additional impedance or resistance elements or brushes having higher resistances to decrease the local currents generated by the reactance voltages in the short circuited coils. When the impedance elements are connected between the brushes and an external circuit, or when high resistance brushes are used there is a decrease in the efficiency of the machine due to the higher resistance losses in the work current flowing between an external circuit and the armature winding. Alternatively, resistance elements formed by high resistance leads are connected between the coil ends and the commutator segments to reduce the local current without increasing losses in the working circuits. These resistance leads cause excessive heat to be generated in the machines which is difficult to dissipate. Further difficulty in the use of the resistance leads results because of unbalanced current division between parallel connected brushes. It is, therefore, desirable to improve commutation by increasing the resistance in the short circuit paths to reduce the local currents which increase brush arcing without increasing the resistance in the working circuits.

SUMMARY OF THE INVENTION

In accordance with the present invention, a commutation system is provided for dynamoelectric machines which reduces the effects of short circuit or local currents without substantial change in the work currents and wherein current is conducted between an external circuit and an armature winding having a duplex lap winding configuration through first and second commutator rings and associated first and second sets of brushes. The armature conductor elements define coil sides connected between segments of both commutator rings and connected together to form two continuous closed armature circuit paths. The first and second set of brushes engage spaced segments on the commutator rings to form working circuits in each of the armature circuit paths between brushes of opposite polarity. Each working circuit includes a pair of brush contacts through which the work currents flow as they engage circumferentially spaced segments of the commutator rings. Two brushes of common polarity bridge two series of adjacent segments so that coils being commutated are short circuited by short circuit paths forming two pairs of brush contacts through which the local currents will flow. This provides additional brush contact resistances and brush voltage drops to decrease the local currents circulating through the coils undergoing commutation so as to minimize the distortion of the desired linear reversing work current. Accordingly, there is a decrease in the level of the local currents to decrease brush arcing while the remaining coils in the working circuits are supplied work current without additional losses.

It is an object of this invention to provide an improved commutation system for dynamoelectric machines wherein the local currents in the short circuit paths of the coils being commutated are reduced by connecting additional brush contact resistance in circuit with the coils without increasing the brush contact resistance connected with the coils in the working circuits.

Another object of this invention is to provide an improved commutation system including first and second commutator rings having closely spaced segments connected to an armature winding so that the commutator segments are connected to coils forming working circuits through a pair of brush contacts formed with a pair of opposite polarity brushes and further forming short circuited coils which undergo commutation between two pairs of brush contacts provided by a pair of brushes of common polarity when they bridge two pairs of adjacent commutator segments so as to increase the brush contact resistance to reduce the level of undesired local currents without using additional impedance circuit elements for reducing the local currents and brush arcing.

A still further object of this invention is to provide a commutation system for a direct current motor including an armature winding formed by a plurality of coils wound in a duplex lap winding configuration with the coil sides defining two continuous closed armature circuit paths, and further wherein first and second commutator rings are connected to the coils by connecting the common coil end of two coil sides to a segment of the first commutator ring which is engaged by one of a pair of brushes having a common polarity when the other brush engages a segment of the second commutator ring which is between segments connected with the opposite ends of the two coil sides, and still further wherein two coil sides are commutated together in a short circuit path formed by the pair of brushes overlapping two pairs of adjacent segments so as to form two pairs of brush contacts comprising the full contact area of each brush in series with the coil sides being commutated, while effectively half of the contact areas of opposite polarity brushes form one pair of brush contacts in series with each of the working circuits, whereby the resistance to the local current flow is increased without adding losses to the work currents.

Further objects and advantages of the present invention will be apparent from the following description, reference being had to the accompanying drawing wherein a preferred embodiment of the present invention is clearly shown.

DESCRIPTION OF THE PREFERRED EMBODIMENT

Figure 1:
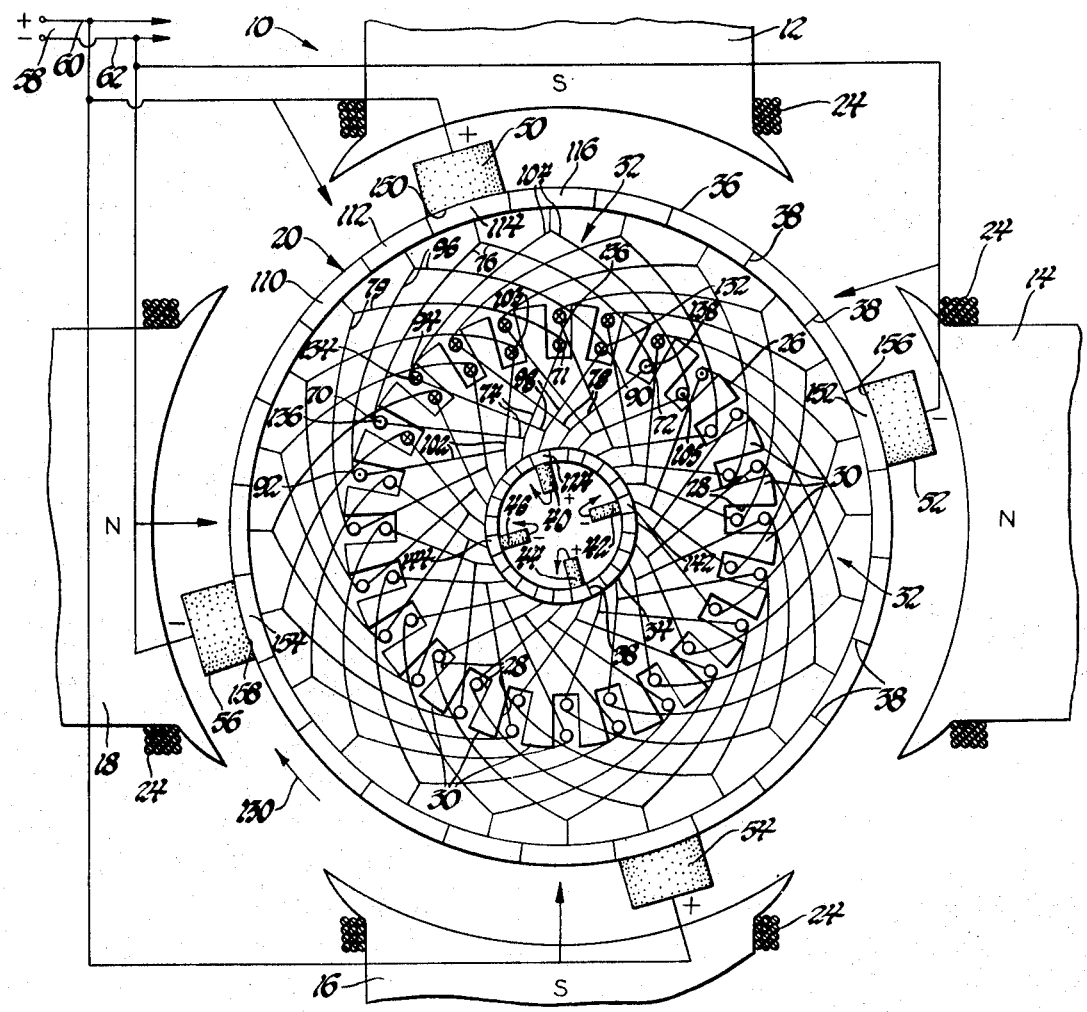
FIG. 1 is a schematic illustration of a dynamoelectric machine including the commutation system of this invention.

Referring now to the drawing wherein the same numeral is used to indicate the same or like element throughout the figures, and more particularly to FIG. 1, wherein there is shown a dynamoelectric machine 10 of the commutator type including the commutation system of this invention. In one preferred embodiment, the dynamoelectric machine 10 is a four pole direct current traction motor operating under heavy load conditions over wide speed ranges. However, it is to be understood that the present invention is not limited to motors since the dynamoelectric machine 10 may be also operated as a generator and is adaptable to alternating current commutator type machines as is understood by those skilled in the art of dynamoelectric machines.

A partial showing of a stator assembly of the dynamoelectric machine 10 is illustrated in FIG. 1 including four circumferentially spaced main field poles formed by pole pieces designated 12, 14, 16, and 18 numbering in a clockwise direction with the top pole piece being designated by the numeral 12. The pole pieces 12, 14, 16 and 18 have salient pole shape and are made of a suitable magnetic iron material extending radially inward from a stationary yoke or magnetic core, not shown, and terminating at pole tips adjacent a rotor assembly generally designated by the numeral 20.

A stator winding formed by main field windings 24 carried on the main field pole pieces 12, 14, 16 and 18 develop alternate polarity magnetic poles forming the main magnetic field of the machine 10. The pole pieces 12 and 16 have a common south polarity designated by the letter S and the poles 14 and 18 have a common north polarity designated by the letter N. The magnetic flux fields of the four main field poles are directed from the tips of the pole pieces 14 and 18, through the rotor assembly 20 and back to the adjacent and oppositely poled pole pieces 12 and 16. The main field magnetic circuits are completed through the stator yoke.

The rotor assembly 20 includes an armature core 26 made of a suitable magnetic iron material formed with a circumferential series of winding slots 28 defining teeth 30. Twenty-four of the winding slots 28 are illustrated for purposes of describing the present invention. The armature core 26 is mounted on the machine shaft, not shown, for rotation in the magnetic flux fields developed by the pole pieces 12, 14, 16 and 18.

A rotor winding forming an armature winding, generally designated by the numeral 32, is formed by two layers of conductor elements carried in the series of winding slots 28. The cross-sectional view of the conductor elements in FIG. 1 indicates a single circular wire conductor, however, it is well known that such a conductor may be replaced by a bundle of wire conductors wrapped together. The conductor elements define a plurality of coil sides when the ends are interconnected to form a plurality of winding coils, as described in detail hereinbelow. Generally, the coils forming the armature winding 32 are wound in the winding slots 28 so as to develop four armature field poles. The electrodynamic reaction between the armature field poles relative to the main field poles causes the armature core 26 to be rotated thereby driving the machine shaft.

First and second commutator rings 34 and 36 are illustrated around the inner and outer circumferences, respectively, of the rotor core 26. In practice, the first and second commutator rings 34 and 36 are mounted on the machine shaft at the front and rear ends, for example, of the armature core 26. The commutator rings include two identical circumferential series of closely spaced segments made of a conductive material, such as copper. The ring diameters are the same although they are shown as being different in the drawing for purposes of illustration. There are 24 segments on each commutator ring corresponding to the 24 winding slots 28 and they are spaced from adjacent segments by thin layers 38 of a sheet insulation material or mica particles in a manner which is well known.

Figure 2:
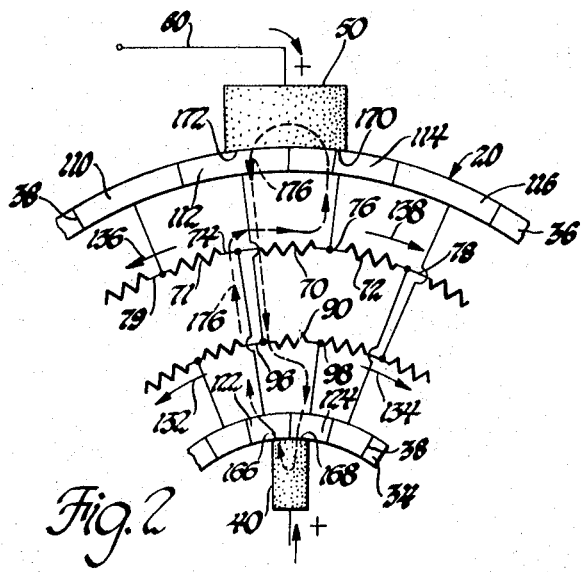
FIG. 2 is an enlarged fragmentary schematic diagram of the armature winding, commutator rings and one pair of brushes of FIG. 1 illustrating a local current path.
Figure 3:
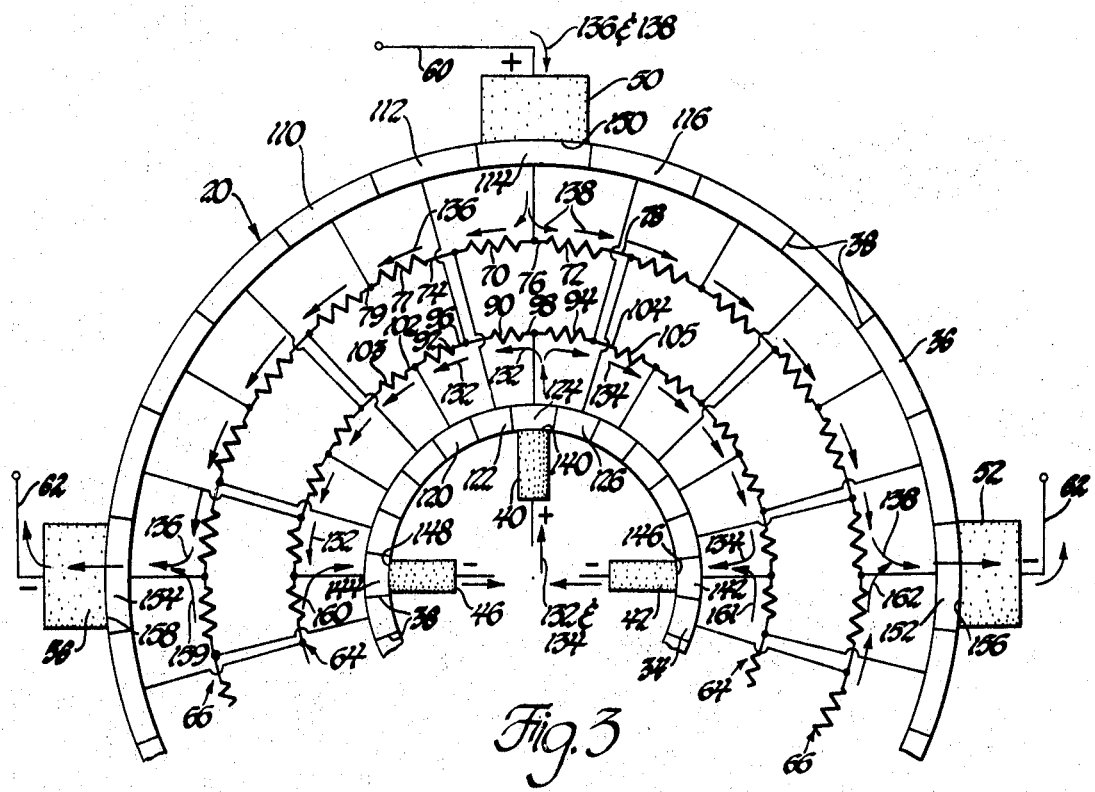
FIG. 3 is a fragmentary schematic diagram of the type shown in FIG. 2 in which the positions of the commutator rings are the same as in FIG. 1.
Figure 4:
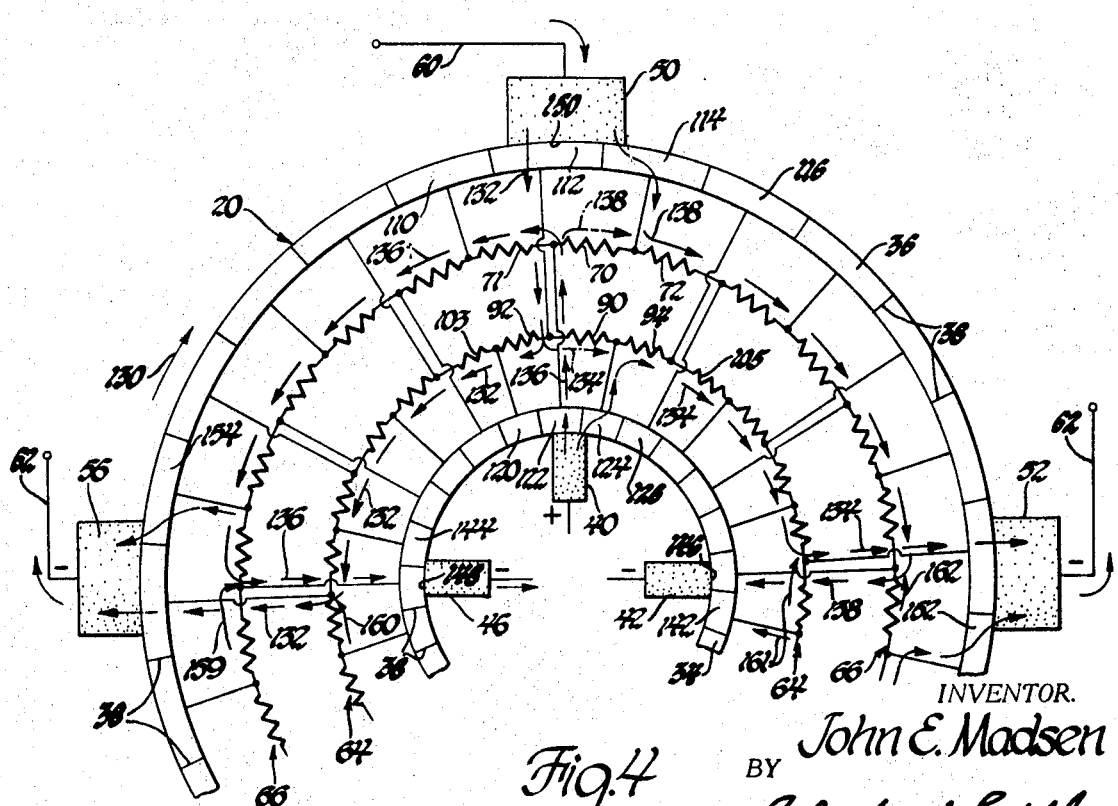
FIG. 4 illustrates a second position of commutator rings which is shifted from that shown in FIG. 3.

The first commutator ring 34 is mounted at the front end of the armature core 26, and is to be considered at the closer end as viewed in Figures of the drawing while the second commutator ring 36 is at the rear of the core and is to be considered at the farther end as viewed in the drawing. Accordingly, the coil ends at the rearward ends of the coil sides extend radially outward toward the commutator ring 36 while the coil ends at the front ends of the coil sides extend radially inward toward the commutator ring 34. Thus, the length of the conductor elements forming the coil sides extend the length of the core 26 and between the rearward coil ends, shown by arcuate lines terminating at the outer peripheral edges of the conductor elements, and front coil ends, shown by arcuate lines terminating at the inner peripheral edges of the conductor elements. In FIGS. 2, 3 and 4 the coil sides are schematically illustrated by resistor symbols representing the resistance of each conductor element and are correspondingly connected as in FIG. 1.

A first set of brushes including the four brushes designated 40, 42, 44 and 46; and a second set of brushes including the four brushes designated 50, 52, 54 and 56 are stationarily mounted in substantially equally circumferential spaced relationship adjacent the first and second commutator rings 34 and 36, respectively, at opposite ends of the armature core 26.

The brushes 40 through 46 and 50 through 56 are made of a suitable carbon or carbon-graphite brush composition and are mounted so that the inner ends form faces in wiping contact with the segments of the first and second commutator rings 34 and 36. The width of each brush is substantially equal to or slightly less than the segments engaged by the brushes so as to contact no more than two adjacent segments. The lengths of the brushes, as well as the lengths of the commutator segments, are one half the lengths of segments and brushes when a single commutator ring and one set of brushes are used to form a conventional commutator system for dynamoelectric machine 10.

The outer ends of the brushes are provided with pigtail type leads for connection to an external circuit 58. The external circuit 58 is connected to a suitable source of direct current power, such as provided by a conventional direct current generator or rectifier circuits, by positive and negative power conductors 60 and 62. The brushes 40, 44, 50 and 54 are designated as positive polarity brushes and are connected in parallel, as indicated by the schematic circuit diagram of FIG. 1, to the positive power conductor 60. The brushes 42, 46, 52, and 54 are negative polarity brushes and are connected in parallel to the negative power conductor 62.

The first and second sets of brushes are orientated relative to the main field pole pieces 12, 14, 16 and 18 so as to energize groups of coils forming working circuits in the armature winding 32 to develop the four armature magnetic field poles in the most effective torque producing relationship with the four main field poles.

Referring now to the arrangement of the armature winding 32, which is fully illustrated in FIG. 1, the two layers of coil sides in the winding slots 28 are interconnected by the coil ends so as to define a duplex lap winding configuration. In this arrangement, one-half of the coil sides, of which there are 24, are connected to either of two continuous armature circuit paths in which each path closes on itself. These two closed armature circuit paths are partially shown in FIGS. 3 and 4 wherein they are designated 64 and 66. The coil sides of each of the closed armature circuit paths 64 and 66 circumferentially span the winding slots 28 so as to form the four armature field poles and close upon themselves in the known manner of a duplex lap winding. For example, in the closed circuit path 66, a coil side 70 is connected in series between coil sides 71 and 72 by a front coil end 74 and rear coil end 76. The front coil end 78 and rear coil end 79 connect the coil sides 70, 71 and 72 in series with the remaining coil sides of the closed armature circuit path 66.

The group of coils formed by the 24 coil sides of the closed armature circuit path 66 can be determined by referring to FIG. 1 beginning with one end of the coil side 70, for example, and following the circuit path around the armature core 26 until it returns to the other end of the coil side 70. The coil sides are laid alternately in the top and bottom layers in the winding slots 28 as the path continues through each of the closed armature circuit paths 64 and 66.

In a similar manner, the closed armature circuit path 64 includes a group of coils formed by the remaining 24 coil sides connected as shown in FIG. 1. One coil side 90 of the path 64 is connected between coil sides 92 and 94 by rear coil end 96 and front coil end 98. A front coil end 102 is connected between coil sides 92 and 103 and a rear coil end 104 is connected between coil sides 94 and 105. The coil sides 90, 92 and 94 are in series with the remaining similarly connected coil sides of the closed armature circuit path 64 extending between the coil sides 103 and 105. The coils forming the closed armature circuit path 64 also can be determined from FIG. 1 beginning, for example, at one end of the coil side 90 and returning to the opposite end.

Reference is now made to the connections, provided by wire leads, between the middle of the coil ends of the armature winding 32 and the segments of the first and second commutator rings. The front and rear coil ends are connected in consecutive order to consecutive segments of the first and second commutator rings 34 and 36, respectively. Accordingly, the rear coil ends 79, 96, 76, and 104 are connected to segments 110, 112, 114 and 116 of the commutator ring 36 and the coil ends 102, 74, 98, and 78 are connected to commutator segments 120, 122, 124 and 126, respectively, of the commutator ring 34. The remaining coil ends of the armature winding 32 are similarly connected to the commutator rings 34 and 36.

With the connections as described hereinabove, each coil side is connected across segments on both of the commutator rings 34 and 36 and in series with circumferentially spaced coil sides in one of the two closed circuit paths 64 and 66. The pairs of the coil sides forming a coil in one closed circuit path are connected between two segments of a common commutator ring which are spaced apart by a third segment connected to a coil end of a coil in the other closed circuit path. For example, coil side 90 is connected in series with the coil side 94 in the armature circuit path 64 and this pair of coil sides is connected between the segments 112 and 116 which are on opposite sides of the segment 114. Accordingly, the coil end 76 of the coil including coil sides 70 and 72 in the armature circuit 66 is then connected to the segment 114.

The first and second sets of brushes 40, 42, 44, 46 and 50, 52, 54, 56 are oriented relative to each other and to the first and second commutator rings 34 and 36, respectively, to develop the proper torque producing orientation of the armature field poles. Each brush of the pairs of brushes having common polarities; namely 40,50; 44,54; 42,52; and 46,56 are radially aligned with the other brush of the pair. The pair of positive brushes 40,50 is diametrically opposite to the remaining pair of positive brushes 44,54. Similarly, the pairs of negative brushes 42,52 and 46,56 are diametrically disposed. This arrangement of the brushes is such that when each is in contact with a single segment, as illustrated in FIGS. 1 and 3, one brush of each pair of common polarity brushes is connected with an end of a coil having opposite ends of its coil sides connected to the two segments adjacent the segment contacted by the other brush of the pair. Accordingly, the positive pair of brushes 40,50 are simultaneously aligned with the centers of the segments 124 and 114, respectively, so that the brush 40 is connected to the coil end 98 of the coil formed by the coil sides 90 and 94 which terminate in coil ends 96 and 104 which, in turn, are connected to the segments 112 and 116, respectively, adjacent the segment 114. Similarly, the coil formed by coil sides 70 and 72 has its coil end 76 connected to the segment 114 and the brush 50 while the opposite coil ends 74 and 78 are connected to the segments 122 and 126 on opposite sides of the segment 124 which is in contact with the brush 40.

Before describing the condition and operation of dynamoelectric machine 10 during commutation of the armature coils, the condition of the machine is described hereinafter wherein the working circuits formed in the armature winding 32 conduct work currents to rotate the rotor assembly 20 in a clockwise direction, as indicated by arrow 130. Current is supplied to the armature winding 32 from the first and second sets of brushes so that, in the direction of positive current flow, current enters from the positive pairs of brushes 40,50 and 44,54 and leaves through the negative pairs of brushes 42,52 and 46,56.

With commutator rings in the positions illustrated in FIGS. 1 and 3, the armature current flow wholly comprises work currents four of which are represented by the solid arrows 132, 134, 136 and 138 in FIG. 3 dividing between four of the eight working circuits formed by four groups of coils comprising six coil sides each in each of the closed circuit paths 64 and 66. The eight working circuits extend between circumferentially adjacent brushes of opposite polarity. The work currents develop the four pole armature magnetic fields which electrodynamically react with the four pole main magnetic fields to produce torque on the machine shaft. In accordance with this, each of the working circuits extends between one of the positive brushes of one set through a group of coils including six coil sides of one of the continuous circuit paths 64 and 66, and to a negative brush of a common commutator ring.

The work currents 132 and 134 leave brush 40 and flow across the brush contact 140, which is formed between the face of the brush and the segment 124, to the front coil end 98. The currents divide at the coil sides 90 and 94, as indicated in FIG. 3. In FIG. 1 the current flowing into and out of the plane of the drawing is indicated by "X's" and "dots (.)" in the centers of the cross sectional views of the coil sides. The work currents 132 and 134 then flow through the coil sides 90 and 94 to the rear coil ends 96 and 104 and continue through coil sides 92 and 105 in a direction out of the plane of the drawing in FIG. 1. Therefore, the work currents 132 and 134 flow into the two working circuits beginning with coil sides 90 and 94 and out the segments 142 and 144, beneath the negative brushes 42 and 46, and across the brush contacts 146 and 148 where the current passes out the brushes 42 and 46 in parallel paths to the negative power conductor 62.

The work currents 136 and 138 flow from the positive brush 50 across the brush contact 150, formed between the face of brush 50 and the segment 114, to the rear coil end 76 where the current divides between two of the working circuits in closed circuit path 66 beginning at coil sides 70 and 72, as indicated in FIG. 3. In FIG. 1, the work currents 136 and 138 pass through the coil sides 70 and 72 in a direction out of the plane of the drawing to the front coil ends 74 and 78 and continue through the coil sides forming the working circuits connected therewith. These working circuits terminate at the segments 152 and 154 forming brush contacts 156 and 158 beneath the negative brushes 52 and 56, respectively, connected to the negative power conductor 62. This forms parallel working circuit paths with each path extending between one pair of brush contacts.

At the instant when each brush is aligned with one of the commutator segments on the commutator rings 34 and 36, the remaining four working circuits also will be formed in the four groups of coils in the remaining portions of the two armature circuit paths 64 and 66. These working circuits extend between the pair of positive brushes 44, 54 and the pairs of negative brushes 42, 52 and 46, 56 in the manner described above. Four work currents 159, 160, 161 and 162, shown at the bottom of FIGS. 3 and 4, of the remaining four working circuits complete the development of the armature magnetic fields which react with the main magnetic fields so as to drive the rotor assembly 20. In accordance with the above description for a steady state condition of FIGS. 1 and 3, each of the working circuits is formed so that its work current flows between one pair of opposite polarity brushes and across one pair of brush contacts.

When the rotor assembly 20 rotates clockwise the brushes begin to overlap adjacent commutator segments. At this time, commutation of work currents in four pairs of coil sides begins. The commutation of the work currents in the coil sides 70 and 90 is described hereinafter, it being understood that the same process of commutation occurs simultaneously in the other three pairs of coil sides in accordance with the present invention. FIG. 4 illustrates the rotor assembly 20 after it has rotated approximately three-fourths the width of one commutator segment from the position of the rotor assembly shown in FIG. 3. Initially, as the rotor assembly begins to move between the positions indicated in FIGS. 3 and 4, the segment 114 leaves the brush 50 while the segment 112 begins to enter contact with the brush 50. Correspondingly, the segments 152 and 154 leave the negative brushes 52 and 56 and, at the first commutator ring, the segments 124, 142 and 144 leave the brushes 40, 42 and 46. This causes a change in the distribution of current from the brushes to the working circuits. This change of work current distribution is constantly varying and involves complex characteristics which are only briefly noted hereinafter to an extent necessary to describe the operation and function of the present invention.

When the rotor assembly 20 moves from the position shown in FIG. 3, current from the brush 40 increasingly begins to supply the work currents 136 and 138 while decreasingly supplying the work currents 132 and 134. Also the current from the brush 50 increasingly begins to supply the work currents 132 and 134 while decreasingly supplying the work currents 136 and 138. Further, commutation of the currents in the coil sides 70 and 90 begins by decrease of the work currents 136 and 132 through these coil sides, under ideal commutation conditions.

The commutation cycle described hereinbelow is completed when the rotor assembly 20 has rotated the distance of one commutator segment. At this time each of the brushes will be aligned with the segments of the first and second commutator rings 34 and 36 adjacent in a counter-clockwise direction from the position of the segments illustrated in FIGS. 1 and 3. For example, the segments 112 and 122 will be beneath the pair of positive brushes 50 and 40. At this time, the work currents 132 and 134 will be supplied wholly from the brush 50 and the work currents 136 and 138 will be supplied wholly from the positive brush 40. Further, the coil sides 70 and 90 will be conducting the working level of the work currents 138 and 134, respectively, which flows through these coils in a direction opposite from the flow of the work currents 136 and 132 when the rotor assembly is in the position shown in FIGS. 1 and 3. Of course, the coil sides 70 and 90 will have assumed a physical position relative to the main field poles of the motor which require that the work currents be maintained in the same predetermined directions relative to the main field poles. Since this is a four pole machine, a given coil side will have its work current reversed four times during each complete revolution.

Referring now further to the distribution of the work currents from the brushes as the rotor is rotated from a position shown in FIG. 3, as the center of the brushes are aligned exactly between adjacent segments, for example when the brushes 40 and 50 are equally overlapping the segments 122 and 124, and 112 and 114, respectively, as shown in FIG. 2. At this instance under the theoretical conditions assumed herein, the positive brush 50 will be equally supplying the work currents 132 and 138. Also, at this time, the work currents 136 and 132 in the coil sides 70 and 90 will be assumed to have decreased to a zero level. Each of the work currents flow from one-half of the area of each positive brush through one of the working circuits and out one-half of the area of the face of a negative brush. This defines one pair of brush contacts in series with each working circuit corresponding to the one pair of brush contacts described in connection with FIG. 3. Accordingly, as shown in FIG. 2 substantially identical brush contacts 166 and 168 are formed between the segments 122 and 124 and the brush 40 and, substantially identical contacts 170 and 172 are formed between the segments 112 and 114 and the brush 50.

As the rotor assembly moves to the position indicated in FIG. 4, the work current 138 is increasingly supplied from the brush 40 and decreasingly supplied from the brush 50. Similarly the work current 134 is increasingly supplied from the brush 50 and decreasingly supplied from the brush 40. At this time also, the current 138 and 134 through the coil sides 70 and 90 (indicated by the phantom arrows) is increasing to the working level of the work current. This level is reached as described hereinabove when the brushes 40 and 50 are solely contacting the segments 122 and 112.

As the brushes bridge adjacent segments, as described hereinabove, the work currents periodically flow from two of the positive brushes and through one of the working circuits and exit through a pair of negative brushes. The entering and exiting work current flow is actually divided into two parallel paths including two pairs of parallel brush contacts as indicated in FIG. 4. However, the brush contact resistance to the work currents remains substantially the same as when commutator segments are in the positions of FIGS. 2 and 3 where each work current flows across one pair of brush contacts. Therefore, for purposes of describing the present invention, one pair of brush contacts are considered as being effectively formed at the ends of each working circuit.

If the current densities in the brushes are considered constant, it can be seen that the level of the work currents will not change. For example, when the brushes 40 and 50 are in the positions indicated in FIG. 4 the increase in the amount of current 138 supplied from the brush 40 and the decrease in the amount of work current 138 supplied from the brush 50 is proportional to the increase of brush contact area between the brush 40 and the segment 122 and the decrease in brush contact area between the brush 50 and the segment 114. Correspondingly, the increase of working current 134 supplied from the brush 50 and decreasingly supplied from the brush 40 is proportional to the increase of contact area between the brush 50 and the segment 112 and the decrease in contact area between the brush 40 and segment 124. Therefore, as noted hereinabove, one pair of brush contacts is effectively formed for conducting the work currents 134 and 138 from the external circuit 58.

Referring now to FIG. 2, it is to be kept in mind that while the distribution of the work currents is changing with the rotation of the rotor core 20, the coil sides 70 and 90 are undergoing commutation since current is being decreased from a full effective working level in one direction, is brought to zero, and is increased to a full effective working level in an opposite direction. When the coil sides 70 and 90 are undergoing commutation they are short circuited by the positive brushes 40 and 50. Reactance voltages generated in the short circuited coils 70 and 90 produce local currents, indicated by the dashed line arrows 176 in FIG. 2. These local currents flow in addition to the working currents described hereinabove.

These reactance voltages can be partially neutralized by producing counteracting voltages in the coil sides by adjusting the position of the brushes and providing commutating poles. This is to cause the coils undergoing commutation to cut magnetic fields produced by the stator in such a manner as to generate counteracting or neutralizing voltages to the self-induced reactance voltages. Since in most practical commutation systems the reactance voltages cannot be entirely neutralized, the local current components add to the work currents to cause a deviation from the desired ideal commutation characteristics. Accordingly, the work currents will not decrease and increase from one full effective level to another in a linear fashion as in the ideal commutation characteristics. These local currents produce uneven current distribution along the brush faces so that current hot spots and sparkings develop between the face of the brushes and the commutator segments.

In the position of the brushes 40 and 50 illustrated in FIG. 2 wherein each equally bridges adjacent segments, the work currents in the coil sides 70 and 90 are assumed to be zero. This occurs when the work currents 132 and 136 have decreased to zero and just prior to the increase of the work currents 134 and 138. The short circuited local current indicated by the dashed lines 176 includes a short circuit path beginning, for example, at the rear coil end 76 of the coil side 70, the path includes the segment 114 and extends across the brush contact 172 and into the brush 50 and back across the brush contact 170 to the segment 112. The rear coil end 96 is connected to the segment 112 so that the path extends to the coil side 90, through the coil side 90 to the front coil end 98 and segment 124. There, the path crosses brush contact 166 into brush 40, through the brush 40 and back across the brush contact 168, whereupon the path returns via the segment 122 to the front coil end 74 which is opposite the aforementioned beginning end of the coil side 70. Thus, there is one pair of brush contacts, 170 and 172, formed in series between commutator segments 112 and 114 and the full face of the brush 50 and a second pair of brush contacts formed in series between segments 122 and 124 and the full face of the brush 40. Accordingly, the coil sides 70 and 90 are short circuited by two pairs of series connected brush contacts provided by the pair of positive brushes 40 and 50 bridging segments 122 and 124 and 112 and 114, respectively.

As described hereinabove, the short circuit paths of the coil sides 70 and 90 include the resistances of each coil side and the contact resistances of the pair of brush contacts 166 and 168, and the pair of brush contacts 170 and 172. The series contact resistances in the path of the local current 176 is increased by twice the contact resistances which are in each of the work current paths. For example, the brush contacts in series with the work current 136 through the coil side 71 includes brush contact 166 and an identical brush contact formed by half the face of the negative brush 56 and half the segment being contacted by it, as noted hereinabove. Also, before and after the segments are in the position of FIG. 2 the full faces of each of the positive brushes 40 and 50 will form two pairs of series brush contacts so as to form twice the contact resistance to the local current 176 as is formed for the work currents being supplied from these brushes as described hereinabove. Therefore, throughout the commutator cycle there is twice the brush contact resistance and voltage drop in the flow of the local currents than is in the flow of the work currents.

Since the resistance of a coil side is very small, it is known that the principal resistance to the local currents in the short circuited paths is due to the resistance or voltage drops across the brush contacts. The voltage drop across a single brush contact is in the order of 1.0 to 1.5 volts. Accordingly, the short-circuited path has additional voltage drop to minimize the local currents which have the undesirable effects of distorting the ideal commutation or perfect reversal of the work currents. Therefore, the arrangement of the armature winding 32 as it is connected to the commutator rings 34 and 36 and in the commutator system of this invention, provides increased resistance to minimize the local currents during the commutation without increasing the resistance and losses of the work currents. The provision of the first and second commutator rings 34 and 36 and connections with the armature circuit can be made in accordance with conventional methods of manufacture already employed for dynamoelectric machines so that no elaborate modifications to existing methods and manufacturing apparatus will be required to provide the invention as described hereinabove.

While the embodiment of the present invention as herein disclosed constitutes a preferred form it is to be understood that other forms might be adopted. For example, it is contemplated that the present invention may be used in other winding arrangements of motors and generators than the duplex lap winding arrangement as described hereinabove. In such other winding arrangements, the coil sides forming a working circuit are connected so that the work currents flow through a pair of brush contacts in series with an external circuit while forming short circuit paths with the coils being commutated so that the local currents flow through at least twice the brush contacts as do the work currents. Thus, the increased brush contact resistance in the short circuit paths is effective to minimize the local currents and reduce brush arcing without increasing the resistance losses in the working circuits.

I claim:

1. In a direct current dynamoelectric machine including a rotor assembly rotatable in electrodynamic relationship with a stator assembly, a commutation system comprising: first and second commutator rings formed by two circumferential series of conductive segments spaced apart by thin strips of insulation material and carried by said rotor assembly; first and second sets of brushes contacting spaced segments of said first and second commutator rings; an armature winding including conductive elements disposed around said rotor assembly to define coil sides of coils terminating at first and second coil ends connected together to form at least two closed armature circuit paths; means connecting said first coil ends of one of said closed armature circuit paths to alternate segments of said first commutator ring and means connecting said first coil ends of a second of said closed armature circuit paths to segments between said alternate segments; means connecting said second coil ends of the one closed armature circuit path to alternate segments of said second commutator ring and means connecting said second coil ends of the second closed armature circuit path to segments between said alternate segments; whereby a plurality of working circuits are formed in said armature winding between a first group of pairs of brushes so that a first group of brush contacts are formed in series with said working circuits for conducting work currents therein and a plurality of short circuited paths including preselected coil sides undergoing commutation are formed between a second group of pairs of brushes so that a second group of brush contacts are formed in series with said short circuit paths for conducting local currents developed therein, and further whereby the contact resistance formed by said second group of brush contacts is greater than the contact resistance formed by said first group of brush contacts thereby reducing the distorting effects of said local currents on said work currents flowing in said preselected coils undergoing commutation.

2. In a direct current dynamoelectric machine including a rotor assembly rotatable in electrodynamic relationship with a stator assembly, a commutation system comprising: first and second commutator rings formed by two circumferential series of conductive segments spaced apart by thin strips of insulation material and carried by said rotor assembly; first and second sets of opposite polarity brushes contacting spaced segments of said first and second commutator rings; an armature winding including conductive elements disposed around said rotor assembly to define coil sides of coils terminating at first and second coil ends connected together to form at least two closed armature circuit paths; means connecting said first coil ends of one of said closed armature circuit paths to alternate segments of said first commutator ring and means connecting said first coil ends of a second of said closed armature circuit paths to segments between said alternate segments; means connecting said second coil ends of said one closed armature circuit path to alternate segments of said second commutator ring and means connecting said second coil ends of said second closed armature circuit path to segments between said alternate segments; a plurality of working circuits formed in each of said closed armature circuit paths with one of said plurality of working circuits extending between one pair of opposite polarity brushes so that a path for work current through said one working circuit includes one pair of brush contacts formed by said one pair of opposite polarity brushes and with rotation of said rotor assembly a short circuit path including preselected coil sides undergoing commutation in each of said closed armature circuit paths is formed between a pair of brushes of common polarity so that a path for local current developed therein includes two pairs of brush contacts formed by said pair of brushes of common polarity, whereby said contact resistance of said two pairs of brush contacts is substantially twice the contact resistance of said one pair of brush contacts to reduce the level of said local currents with reducing the level of said work current flowing through said working circuits.

3. In a direct current dynamoelectric machine including a rotor assembly rotatable in electrodynamic relationship with a stator assembly, a commutation system comprising: first and second commutator rings formed by two circumferential series of conductive segments spaced apart by thin strips of insulation material and carried by said rotor assembly; first and second sets of brushes contacting spaced segments of said first and second commutator rings; an armature winding including conductive elements disposed around said rotor assembly defining coil sides of coils connected together to form a first group of coil sides in one closed armature circuit path and a second group of coil sides in another closed armature circuit path; means connecting each coil side of said one group of coil sides between alternate segments of said first commutator ring and alternate segments of said second commutator ring; means connecting each coil side of said second group of coil sides between the remaining unconnected segments of said first commutator ring and the remaining unconnected segments of said second commutator ring; said first group of coil sides and said second group of coil sides being divided into a plurality of working circuits formed between first pairs of brushes so that a path for work current in series with each working circuit includes one pair of brush contacts; and coil sides at the ends of each working circuit being formed in a plurality of short circuit paths for commutation between second pairs of brushes so that a path for local current includes two pairs of brush contacts, whereby said local current passing through a coil side connected in a short circuit path flows through more contact resistances than said work current flows through when passing through a coil side connected in a working circuit, thereby reducing the level of said local current and arcing at the brush contacts without reducing the work currents.

4. In a direct current motor including a rotor assembly rotatable in electrodynamic relationship with a stator assembly, a commutation system comprising: first and second commutator rings formed by two circumferential series of conductive segments spaced apart by thin strips of insulation material and carried at opposite ends of said rotor assembly; first and second sets of opposite polarity brushes contacting spaced segments of said first and second commutator rings; an armature winding including conductive elements disposed around said rotor assembly defining coil sides of coils connected together in a duplex lap winding configuration forming first and second closed armature circuit paths; means connecting pairs of said coil sides in series in said first closed armature circuit path end between alternate segments of said first commutator ring and connecting pairs of said coil sides in series in said second closed armature circuit path and between alternate segments of said second commutator ring; means connecting the junctions of each of said pairs of coil sides to the unconnected segments of the other commutator ring so that each coil side is connected across segments of each of said first and second commutator rings; groups of coil sides in said first and second closed armature circuit paths defining a plurality of working circuits extending between pairs of opposite polarity brushes in said first and second sets of brushes so that a path for work current is formed in series with each working circuit including one pair of brush contacts; and pairs of coil sides being formed in a plurality of short circuit paths for commutation between pairs of common polarity brushes so that a path for local current is formed including one pair of said coil sides and two pairs of brush contacts, whereby each local current passing through a coil side connected in a short circuit path flows through twice the brush contact resistances that each work current flows through when passing through a coil side connected in a working circuit, thereby reducing the level of said local current and arcing at the brush contacts without reducing the work currents.

* * * * *